US007926937B2

(12) United States Patent
Spinnato et al.

(10) Patent No.: US 7,926,937 B2
(45) Date of Patent: Apr. 19, 2011

(54) EYEWEAR

(75) Inventors: Robert Spinnato, Glenbrook, NV (US); Keely Spinnato, Glenbrook, NV (US)

(73) Assignee: Spinn Products LLC, Glenbrook, NV (US)

( * ) Notice: Subject to any disclaimer, the term of this patent is extended or adjusted under 35 U.S.C. 154(b) by 0 days.

(21) Appl. No.: 12/460,204

(22) Filed: Jul. 14, 2009

(65) Prior Publication Data

US 2010/0271585 A1    Oct. 28, 2010

(51) Int. Cl.
*G02C 5/14*    (2006.01)
(52) U.S. Cl. .......... 351/111; 351/41; 351/113; 351/123; 351/156
(58) Field of Classification Search ............ 351/41, 351/44, 51, 52, 111–123, 155–158
See application file for complete search history.

(56) References Cited

U.S. PATENT DOCUMENTS

| 181,908 | A | * | 9/1876 | Chandler | 351/123 |
| 417,080 | A | * | 12/1889 | Peck | 351/123 |
| 3,419,909 | A | * | 1/1969 | Spain | 2/174 |
| 5,369,452 | A | * | 11/1994 | Williams | 351/157 |
| 2009/0122253 | A1 | * | 5/2009 | Clay | 351/52 |
| 2010/0192631 | A1 | * | 8/2010 | Richmond | 63/23 |

\* cited by examiner

*Primary Examiner* — Huy K Mai
(74) *Attorney, Agent, or Firm* — Thomas R. Lampe

(57) ABSTRACT

Eyewear includes a pair of glasses with an eyeglass frame having eyeglass temples but no earpieces, the distal ends of the temples operable as pivots to allow the eyeglass frame to pivot between use and non-use positions. The eyewear also includes a retainer member connected to the eyeglass temples as well as articles releasably connected to the eyeglass frame while in recesses formed by the frame.

8 Claims, 3 Drawing Sheets

EYEWEAR

TECHNICAL FIELD

This invention relates to eyewear in the form of a pair of glasses to be worn by an individual and which includes structural elements facilitating pivotal movement between a use position and a tilted non-use position. The invention also encompasses a retainer member connected to the eyeglass temples and structure wherein small medallions or similar articles are releasably connected to the eyeglass frame.

BACKGROUND OF THE INVENTION

It is well known to tilt pairs of glasses from the normal use position to a non-use position where the lens holding structure of the frame is located at or above the user's forehead. Since conventional eyeglass frames normally incorporate earpieces or other structure extending above and often beyond a wearer's ears, tilting of conventional glasses to a non-use position can muss or disarrange his or her hair. Furthermore, tilting of glasses in such a manner can be totally precluded in certain cases, for example when the eyeglass wearer is wearing a helmet or other headgear that would impede or prevent tilting of the glasses to the forehead. As will be seen below, the eyeglass frame of the present invention does not utilize earpieces.

The eyewear of the present invention also encompasses a double-ended, flexible, elongated eyeglass retainer member connected to the eyeglass temples and extending therebetween. This must be compared with the usual eyewear structure wherein eyeglass retainers are often connected to and extend between earpieces. In addition, the eyewear disclosed and claimed herein incorporates a feature which includes one or more articles, such as small medallions, to be releasably retained in recesses formed in the eyeglass frame. The articles may readily be removed and replaced by others. This may be, for example, for the purpose of allowing different logos to be employed with the eyewear or allowing articles of different colors or appearances to be employed and provide different aesthetic effects.

DISCLOSURE OF INVENTION

The present invention relates to eyewear comprising a pair of glasses to be worn by an individual. The pair of glasses includes an eyeglass frame defining eyeglass lens openings. The eyeglass frame includes a nose bridge located between the eyeglass lens openings and two spaced, pivotally mounted side supports, with each side support wholly comprised of an eyeglass temple and not including an earpiece.

The eyeglass temples have temple distal ends and proximal ends pivotally connected to the rest of the eyeglass frame, the length of the side supports being the length of the eyeglass temples.

The eyeglass temples are for the purpose of exerting opposed clamping forces on opposite sides of an individual's head without touching the individual's ears either in a frame use position wherein the eyeglass lens openings are in front of the individual's eyes and the eyeglass temples are substantially horizontal or in the frame non-use position wherein the eyeglass lens openings are elevated relative to the individual's eyes and the eyeglass temples are angled upwardly from the temple distal ends.

The eyewear disclosed herein additionally comprises a double-ended, flexible, elongated eyeglass retainer member connected to the eyeglass temples and extending therebetween. Furthermore, the eyeglass frame defines at least one recess, the eyewear additionally comprising an article positioned in the recess and connector structure releasably connecting the article to the eyeglass frame while in the recess.

Other features, advantages and objects of the present invention will become apparent with reference to the following description and accompanying drawings.

MODES FOR CARRYING OUT THE INVENTION

Figure 9:
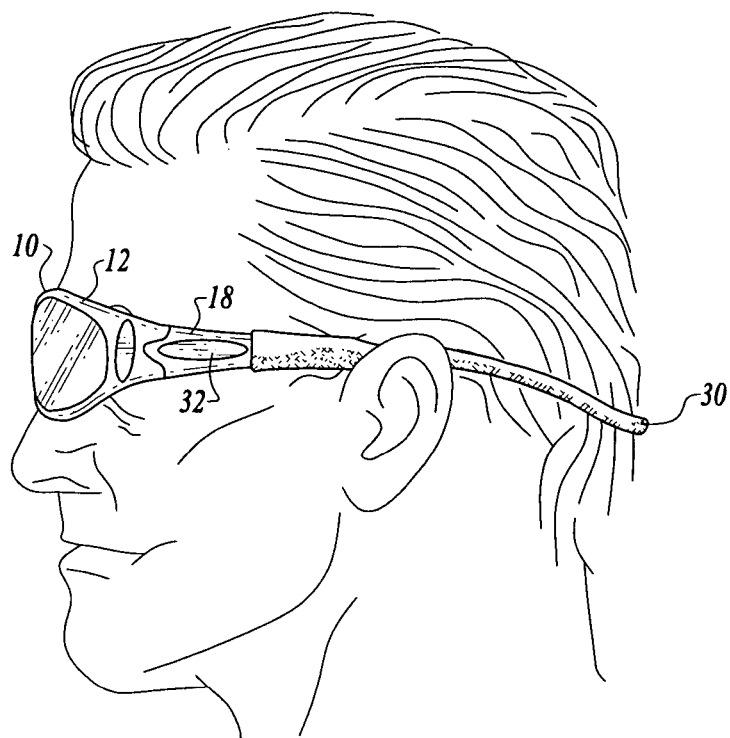
FIG. 9 is a side, elevational view showing the eyewear of the invention in place on an individual's head, the eyewear being in normal use position.
Figure 10:
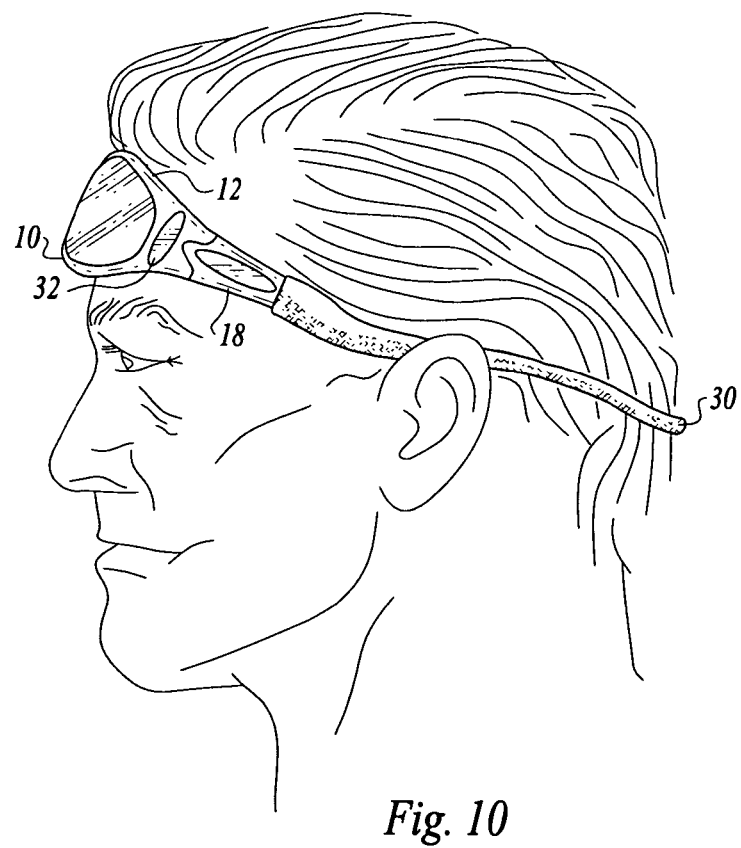
FIG. 10 is a view similar to FIG. 9, but illustrating the eyewear in non-use position with the eyeglass frame tilted upwardly from the distal ends of the eyeglass temples.

Referring now to FIGS. 1-6 and 8-10, eyewear constructed in accordance with the teachings of the present invention includes a pair of glasses 10. FIGS. 9 and 10 show the eyewear worn by an individual.

The pair of glasses includes an eyeglass frame 12 defining lens openings 14 having lenses therein. The eyeglass frame includes a nose bridge 16 located between the eyeglass lens opening and two spaced, pivotally mounted side supports, each side support wholly comprised of an eyeglass temple 18 and not including an earpiece, a component normally found in pairs of glasses.

The eyeglass temples have temple distal ends 20 and proximal ends 22 pivotally connected to the rest of the eyeglass frame, the length of the side supports consequently being the length of the eyeglass temples. The distal ends 20 may be coated with plastic or other suitable material to provide a slip resistant surface.

The eyeglass temples are for the purpose of exerting opposed clamping forces on opposite sides of an individual's head without touching the individual's ears either in a frame use position wherein the eyeglass lens openings are in front of the individual's eyes and the eyeglass temples are substantially horizontal (the position shown in FIG. 9) or in a frame non-use position (the position shown in FIG. 10) wherein the eyeglass lens openings are elevated relative to the individual's eyes and the eyeglass temples are angled upwardly from the temple distal ends.

The eyeglass temples 18 have flat inner surfaces 24 for facing opposite sides of the head of the individual. The temple distal ends are operable as pivots to allow the eyeglass frame to pivot relative to the individual's head about the temple distal ends when the eyeglass frame is moved between the frame use and frame non-use positions. This can occur with the temple distal ends remaining at the same locations on the user's head. Thus, pivoting to non-use position is readily accomplished even if a helmet or other headgear is worn by the user. Such headgear would normally not preclude upward movement of the front of the eyeglasses 10 which employ a much shorter side support than would be the case if earpieces were employed.

Another structural component of the disclosed eyewear is a double-ended, flexible, elongated eyeglass retainer member 30 connected to the eyeglass temples 18 and extending therebetween. In the arrangement illustrated, the eyeglass retainer member 30 is tubular and has opposed open ends receiving and frictionally engaging the eyeglass temples. More particularly, the eyeglass retainer member may be as disclosed in our co-pending U.S. patent application Ser. No. 12/319,970, filed Jan. 14, 2009. It will be appreciated however that other types of double-ended, flexible, elongated eyeglass retainer members can be employed and connected to the eyeglass temples in some manner. Employing temple distal ends coated or otherwise covered in plastic or other suitable material will provide a slip resisting connection between the temples and the retainer member.

Again with reference to FIGS. 9 and 10, it will be seen that tilting of the glasses causes only the forward ends of the eyeglass retainer member to move upwardly, the major portion of the retainer member between the end portions remaining in place on the user's head. Thus, the user's hair will not be disturbed due to such movement. Furthermore, a helmet or other headgear, if worn, will normally not impede in any manner movement of the end portions connected to the temples.

The eyeglass frame 12 incorporates a number of articles in the form of oblong-shaped small medallions 32 which may be utilized simply for decorative purposes or which may carry logos, brand names, etc. All or some of these articles are releasably connected to the eyeglass frame so that they may be readily removed and replaced, as desired. The articles can have different shapes.

Figure 1:
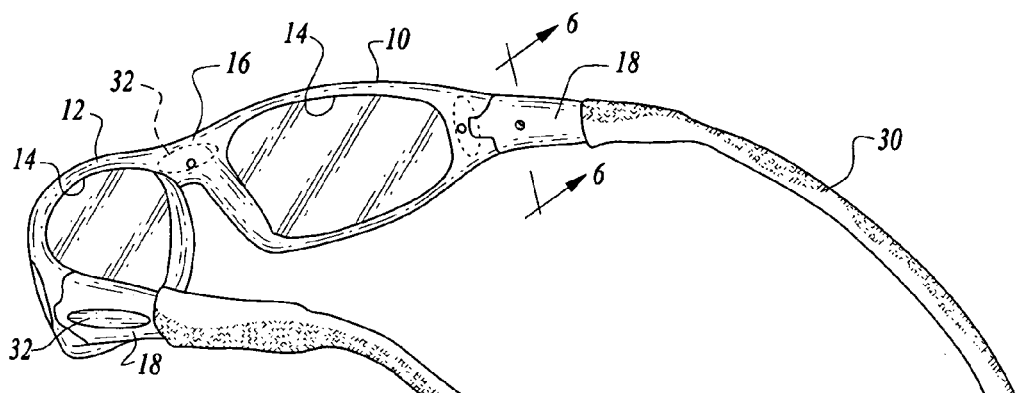
FIG. 1 is a perspective view of eyewear constructed in accordance with the teachings of the present invention as viewed from the back of the eyeglass frame.
Figure 2:
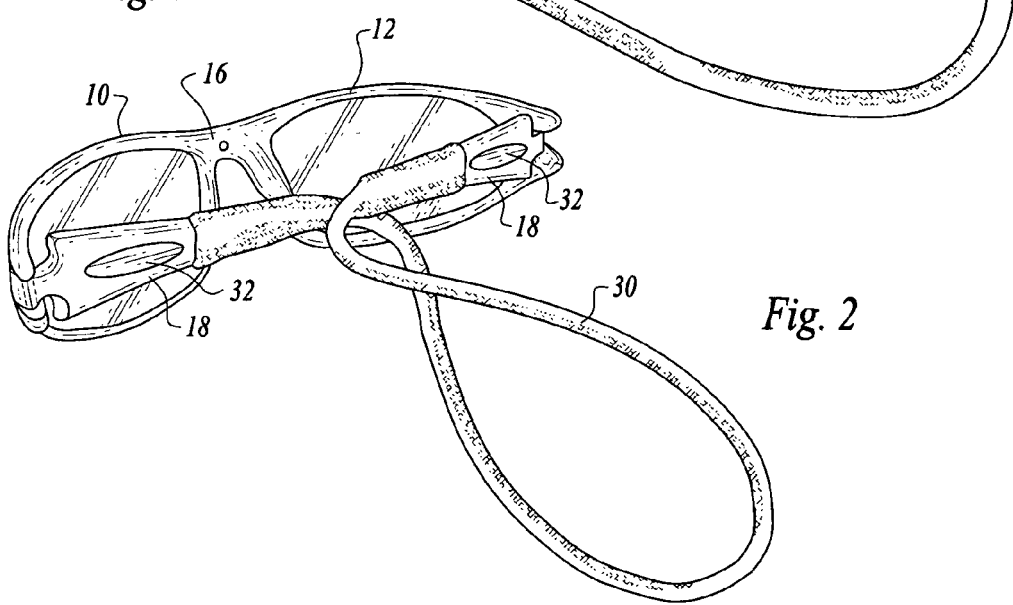
FIG. 2 is a view similar to FIG. 1, but illustrating the side supports of the eyeglass frame pivoted to a closed position.
Figure 3:
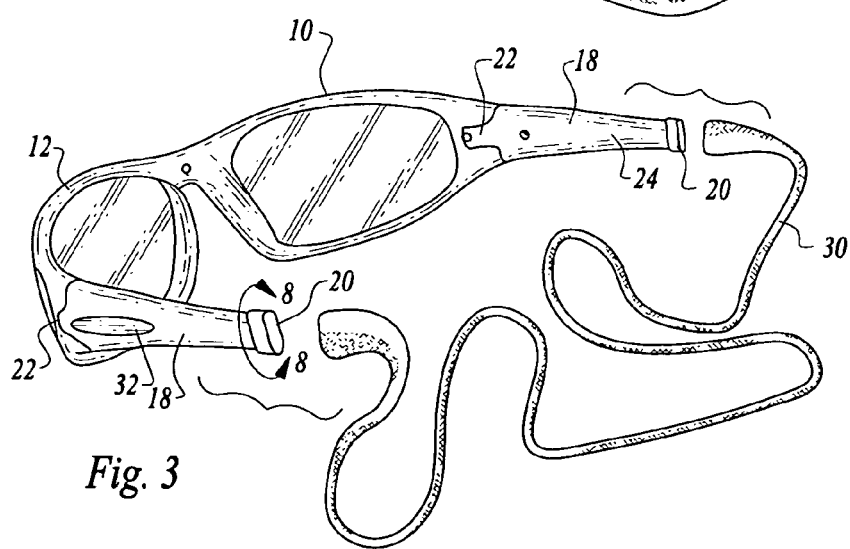
FIG. 3 is a perspective view as taken from the back of the eyewear showing an eyeglass retainer member of the invention separated from the eyeglass frame of the invention.
Figure 4:
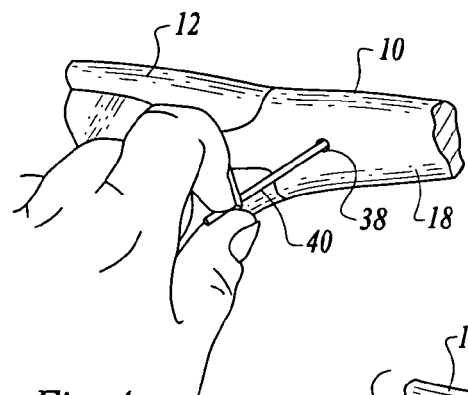
FIG. 4 is a perspective view illustrating a portion of the eyeglass frame including a temple segment defining an access opening passing through the temple through which a pin is being inserted by an individual.
Figure 5:
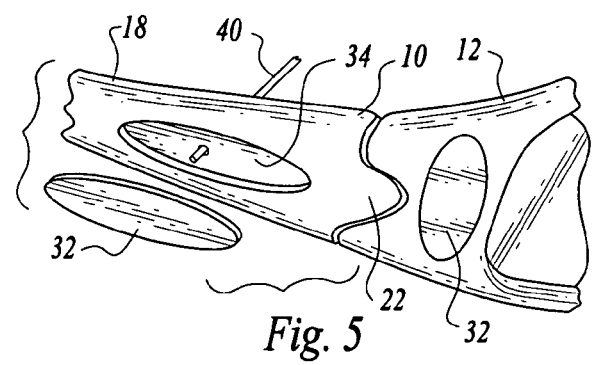
FIG. 5 is a perspective view showing the outer surface of the temple through which the pin has been inserted and utilized to dislodge a small medallion from a recess formed in the temple.
Figure 6:
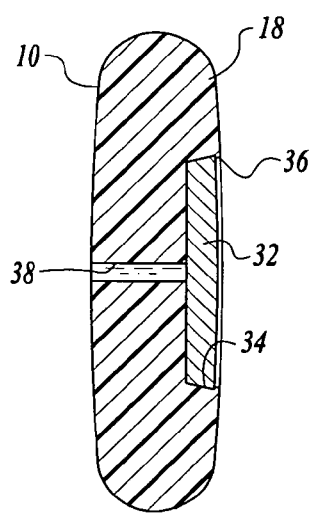
FIG. 6 is an enlarged, cross-sectional view taken along the line 6-6 in FIG. 1 and illustrating the article in place in the temple recess.

FIGS. 4, 5 and 6 show details of one such article 32 which is positioned in a recess 34 in a temple, connector structure being employed to releasably connect the article 32 to the eyeglass frame while it is in the recess. In FIGS. 4-6 the article 32 is held in place in recess 34 by an inwardly extending lip located at the outer surface of the temple, the lip being identified by reference numeral 36. That is, releasable retention of the article in the recess is due to frictional engagement between the article and the eyeglass frame.

An access opening 38 is formed in the temple and is in communication with the recess 34. This is for the purpose of allowing access to the recess by a pin 40 or other object manually employed to engage the article and push the article out of the recess, as illustrated in FIGS. 4 and 5.

Figure 7:
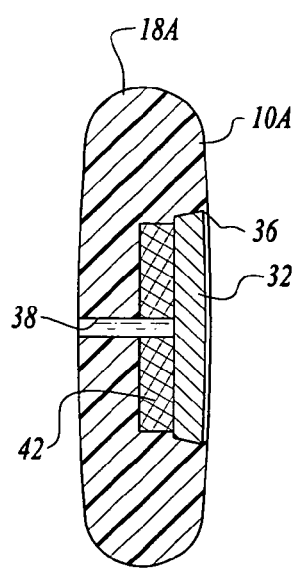
FIG. 7 is a view similar to FIG. 6, but illustrating an alternative embodiment of structure employed to releasably retain an article in a recess.
Figure 8:
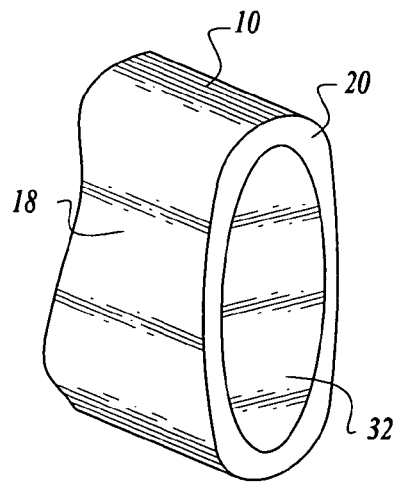
FIG. 8 is an enlarged, perspective view of that portion of the distal end of the temple designated by double-headed arrow 8-8 in FIG. 3.

FIG. 7 illustrates another eyeglass arrangement 10A wherein the article 32 is releasably retained in the recess 36 of temple 18A by a magnet 42 adjacent to the recess. An access opening 38 extends through a passageway in the center of the magnet.

The invention claimed is:

1. Eyewear comprising, in combination:
a pair of glasses to be worn by an individual, said pair of glasses including an eyeglass frame defining eyeglass lens openings, and said eyeglass frame including a nose bridge located between said eyeglass lens openings and two spaced, pivotally mounted side supports with each side support wholly comprised of a single piece, substantially straight eyeglass temple not including an earpiece, said eyeglass temples having temple distal ends and temple proximal ends pivotally connected to the rest of said eyeglass frame, said eyeglass temples further having between the temple distal and proximal ends thereof elongated, flat inner head engagement surfaces for facing and engaging opposite sides of the head of an individual, said elongated, flat inner head engagement surfaces extending substantially the full lengths of said eyeglass temples, and said eyeglass temples being free of structure projecting inwardly from said elongated, flat inner head engagement surfaces, said elongated, flat inner head engagement surfaces for the purpose of exerting opposed clamping forces along substantially the full lengths thereof on opposite sides of an individual's head without touching the individual's ears either in a frame use position wherein the eyeglass lens openings are in front of the individual's eyes and the eyeglass temples are substantially horizontal or in a frame non-use position wherein the eyeglass lens openings are elevated relative to the individual's eyes and the eyeglass temples are angled upwardly from the temple distal ends; and
a double-ended, flexible, elongated eyeglass retainer member releasably connected to said eyeglass temples and extending therebetween, said eyeglass retainer member being tubular and having opposed open ends receiving the temple distal ends and surrounding and frictionally engaging the temple distal ends to assist and cooperate with the eyeglass temples in maintaining the pair of glasses on the head of the individual selectively either in the frame use position or frame non-use position, the connection between said temple distal ends and the ends of said eyeglass retainer member being a slip resistant connection.

2. The eyewear according to claim 1 wherein said eyeglass frame defines at least one recess, said eyewear additionally comprising an article positioned in said recess and connector structure releasably connecting said article to said eyeglass frame while in said recess.

3. The eyewear according to claim 2 wherein said recess and said article have substantially the same outer peripheral configuration.

4. The eyewear according to claim 2 wherein indicia is located on said article and observable when said article is positioned in said recess.

5. The eyewear according to claim 2 wherein said article is releasably retained in said recess due to frictional engagement between said article and said eyeglass frame.

6. The eyewear according to claim 5 wherein said eyeglass frame additionally defines an access opening passing therethrough in communication with said recess for allowing access to said recess by an object employed to engage said article and push said article out of said recess.

7. The eyewear according to claim 2 wherein said connector structure comprises a magnet adjacent to said recess for magnetically releasably retaining said article in said recess.

8. The eyewear according to claim 1 wherein said temple distal ends are covered by slip resistant material.

* * * * *